United States Patent [19]

Fuller

[11] 4,014,004

[45] Mar. 22, 1977

[54] AUTOMATIC REPORT REGISTER

[75] Inventor: Robert Melvin Fuller, Rochester, N.Y.

[73] Assignee: Harris Corporation, Cleveland, Ohio

[22] Filed: Aug. 4, 1975

[21] Appl. No.: 601,561

[52] U.S. Cl. ........................ 340/172.5; 340/152 T; 325/31

[51] Int. Cl.² .................... G06F 1/00; G06F 15/48; H04Q 9/00; H04B 1/38

[58] Field of Search ........ 340/172.5, 152 R, 152 T; 325/31

[56] References Cited

UNITED STATES PATENTS

| | | | |
|---|---|---|---|
| 3,058,065 | 10/1962 | Freeman et al. | 325/31 |
| 3,593,293 | 7/1971 | Rorholt | 340/152 R |
| 3,623,013 | 11/1971 | Perkins | 340/172.5 |
| 3,665,417 | 5/1972 | Low et al. | 340/172.5 |
| 3,668,649 | 6/1972 | Pederson et al. | 340/172.5 |
| 3,725,871 | 4/1973 | Heuttner et al. | 340/172.5 |
| 3,757,035 | 9/1973 | Sullivan | 340/152 T |
| 3,820,075 | 6/1974 | Ebner | 340/172.5 |

*Primary Examiner*—Raulfe B. Zache
*Attorney, Agent, or Firm*—Charles C. Krawczyk

[57] ABSTRACT

A report register, for use in conjunction with radio receiver-transmitter of a mobile unit, such as a ship, for receiving, storing and displaying stored data, and being responsive to interrogation signal from a distant station for automatically outpulsing the stored data. A mode switch selects the storage location and identifies the data to be stored and includes an output position for enabling the register to automatically outpulse the data, in a preset sequence including the identity of the mobile unit, in response to the interrogation signal.

19 Claims, 16 Drawing Figures

AUTOMATIC REPORT REGISTER

BACKGROUND OF THE INVENTION

In order to operate fleets of transporting vehicles, such as trucks, ships etc., efficiently and profitably, it is highly desirable for the dispatching office to continuously know, or accurately estimate, the location of each vehicle, its destination, future destinations, cargo etc. In the case of Great Lakes shipping this information is needed so that the dispatching office can properly assign cargoes and docking and unloading assignments to minimize passages with empty cargo holds and waiting time for docks. This is particularly troublesome in the event of schedule changes due to breakdowns, cancelled cargoes, etc., wherein the dispatcher must change ship assignments to continue the previously planned assignments with a minimum of lost time and cargo. Often the ship dispatcher will trade cargoes with other shipping companies to fill voids in the ship's schedules.

In order to have sufficient information for proper scheduling, the ships periodically contact the dispatching office by radio as to their position and destination. The reporting periods can vary from daily, to several times a day, depending upon the size of the fleet and the reporting procedures set up by the various shipping companies. The messages are generally picked by a remote station and transmitted to a central receiving office, where the messages are in turn available to the shipping offices via the teletype network. The information sent usually includes the date, the ship's location, departure time if in port, the present destination and future destinations, and any additional special reports or messages. In addition various shipping companies are cooperating in providing a weather report. The weather information generally includes wind speed and direction, cloud cover, visibility, air and water temperatures, period and height of waves, and ice conditions. This information is compiled to provide an accurate and up-to-date weather report for Great Lakes Shipping. It should be understood that although the background of this invention is being specifically directed towards Great Lakes Shipping, the invention will apply to ocean shipping, trucking operations and other situations wherein the destinations, cargoes, loading time etc., of mobile vehicles are controlled from distant stations.

At the present time, the communication link between the ship and the dispatcher's office is provided by a communication company that has a series of receiver-transmitter repeater stations about the Great Lakes, which receive the messages from the ship and send them on to the dispatcher's office via the central office. The expense involved is based upon, among the items, the time involved in conducting the radio communications between the ship and the communication company. Hence, the length of the radio message and the number of messages enter into the expense involved in the communications cost of operation of the dispatcher's office.

There are times a ship may be at a location wherein the navigational requirements are such that it is undesirable to make reports, or to answer communications from the dispatcher's office. It would be highly advantageous to have an automatic reporting arrangement or system in which the data to be communicated is prepared at some convenient time and automatically transmitted when needed or requested, thereby alleviating the crew from this responsibility at times when their services are needed elsewhere.

The communication company generally has message centers wherein the ship's messages are received, recorded and subsequently transmitted to the dispatcher's office. The message can also be inserted into a computer at the communication company along with sufficient data to automatically calculate, upon request, the ship's location at any later time. It would be advantageous if an automatic reporting system was provided that transmitted messages in a digital form that could automatically be processed by the computer thereby eliminating the need for the operator conversion of messages into digital form.

It is therefore an object of this invention to provide a new and improved report register for mobile vehicles, such as ships and the like, for transmitting information in digital form.

It is also an object of this invention to provide a new and improved report register that can be used in conjunction with a radio included on a mobile vehicle for automatically outpulsing data in digital form.

It is also an object of this information to provide a new and improved report register for mobile vehicles for storing data in digital form and for automatically outpulsing the same in response to an interrogation signal.

It is still a further object of this invention to provide a new and improved report register that provides means for storing navigational data, weather data etc., in digital form and for outpulsing the same in response to an interrogation signal.

BRIEF DESCRIPTION OF THE INVENTION

An automatic report register for mobile vehicles such as ships, and the like, usable in conjunction with radio equipment for providing digital data to a distant station in response to an interrogation signal.

The report register includes a mode selector switch having a plurality of positions for recording data in selected storage locations, and a transmit position for outpulsing the recorded data. Input switch means, such as a keyboard, is provided for inserting the data into the register. Display means are provided for displaying the data as it is being inserted and that has been stored. When the mode selector switch is in the transmit position, the register is responsive to a preselected interrogation signal for outpulsing the stored data via the radio equipment to the shore station. With this arrangement, the data to be communicated can be inserted into the register at a convenient time and automatically transmitted upon request to the distant station.

The register includes means responsive to a preset coded interrogation signal and rejecting all others, and also includes means for precoding the digital signals with the vehicle's identity in a format that is compatable for automatic input into a computer at the distant station.

The arrangement is such that, the time used in interrogating the ship and responding to the interrogation signal is extremely short, thereby using very little time for communicating the data, leaving the airways clear to conduct other business.

DETAILED DESCRIPTION OF THE INVENTION

Figure 1:
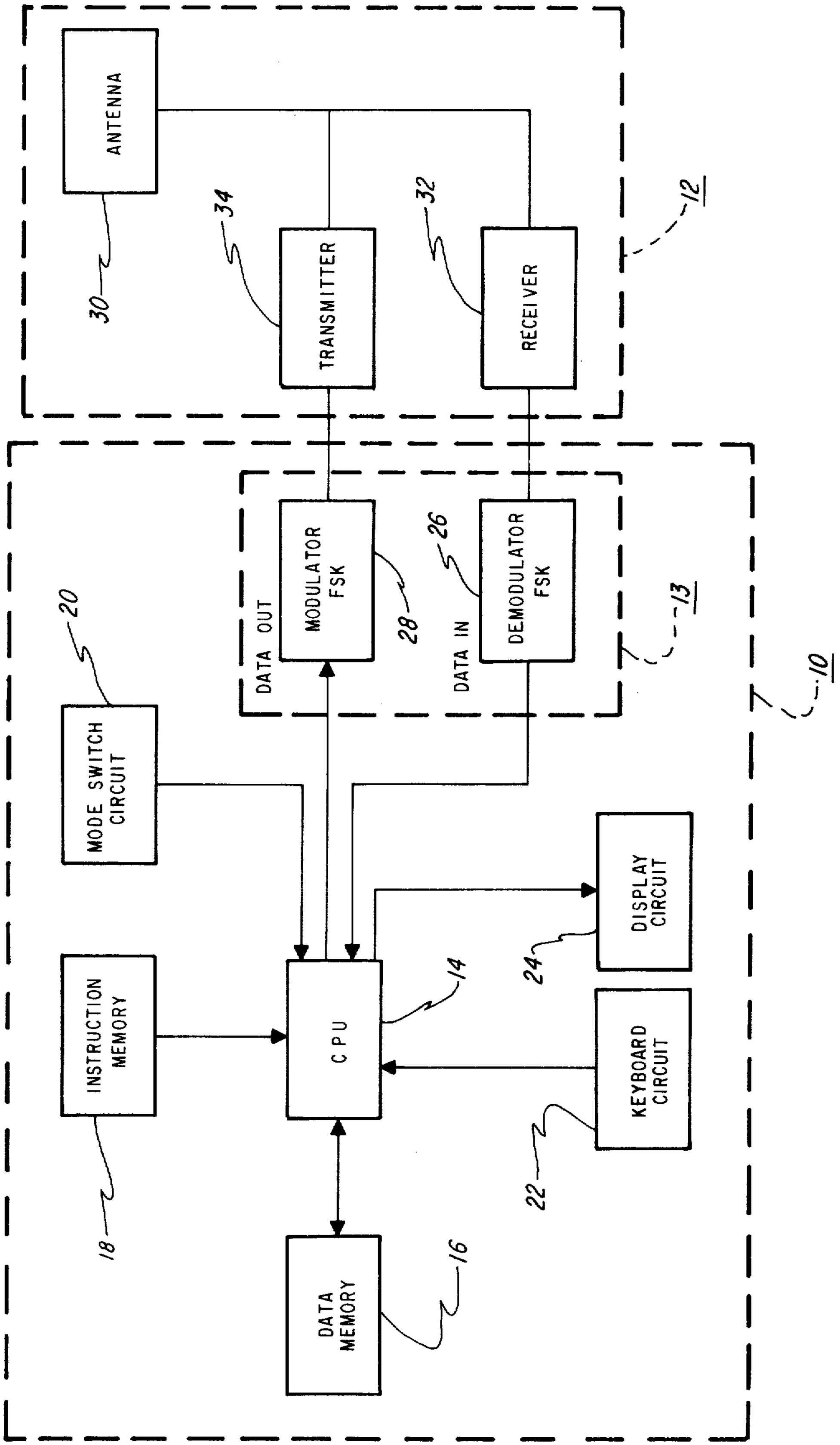
FIG. 1 is a block diagram of the report register of the invention connected to a radio transmitter-receiver.

FIG. 1 includes a block diagram of the report register 10, including the invention, connected to a radio transmitter-receiver 12. The report register 10 includes a central processor unit 14 connected to a data memory 16 and an instruction memory 18. The mode of operation and the data to be recorded is controlled by a mode selector switch circuit 20. The data is applied to the CPU 14 via keyboard circuit 22. The data, as it is received by the CPU 14 and stored by the data memory 16, is displayed by a display circuit 24. The CPU 14 is also connected to a demodulator circuit 26 and a modulator circuit 28 in a modem 13. The demodulator 26 and the modulator 28 are connected to a receiver circuit 32 and a transmitter circuit 34, respectively, which in turn are connected to an antenna 30. The radio transmitter-receiver 12 can be of any type wherein operation can be automatically controlled by the report register 10.

The mode select switch circuit 20 identifies the type of data to be received from the keyboard circuit 22 and the location of the data is to be stored in the data memory 16, and also presets the report register 10 in output ready or transmit condition. When in the transmit condition, the report register 10 is responsive to a precoded interrogation signal (received via the transmitter-receiver 12) to outpulse the data from the data memory 16 to enable the transmitter-receiver 12 to transmit the data. The report register 10 includes circuit means for identifying and responding to a preset interrogation signal and rejecting all others. The report register 10 also sends a precoded signal for identifying the report register transmitting the data.

Figure 2:
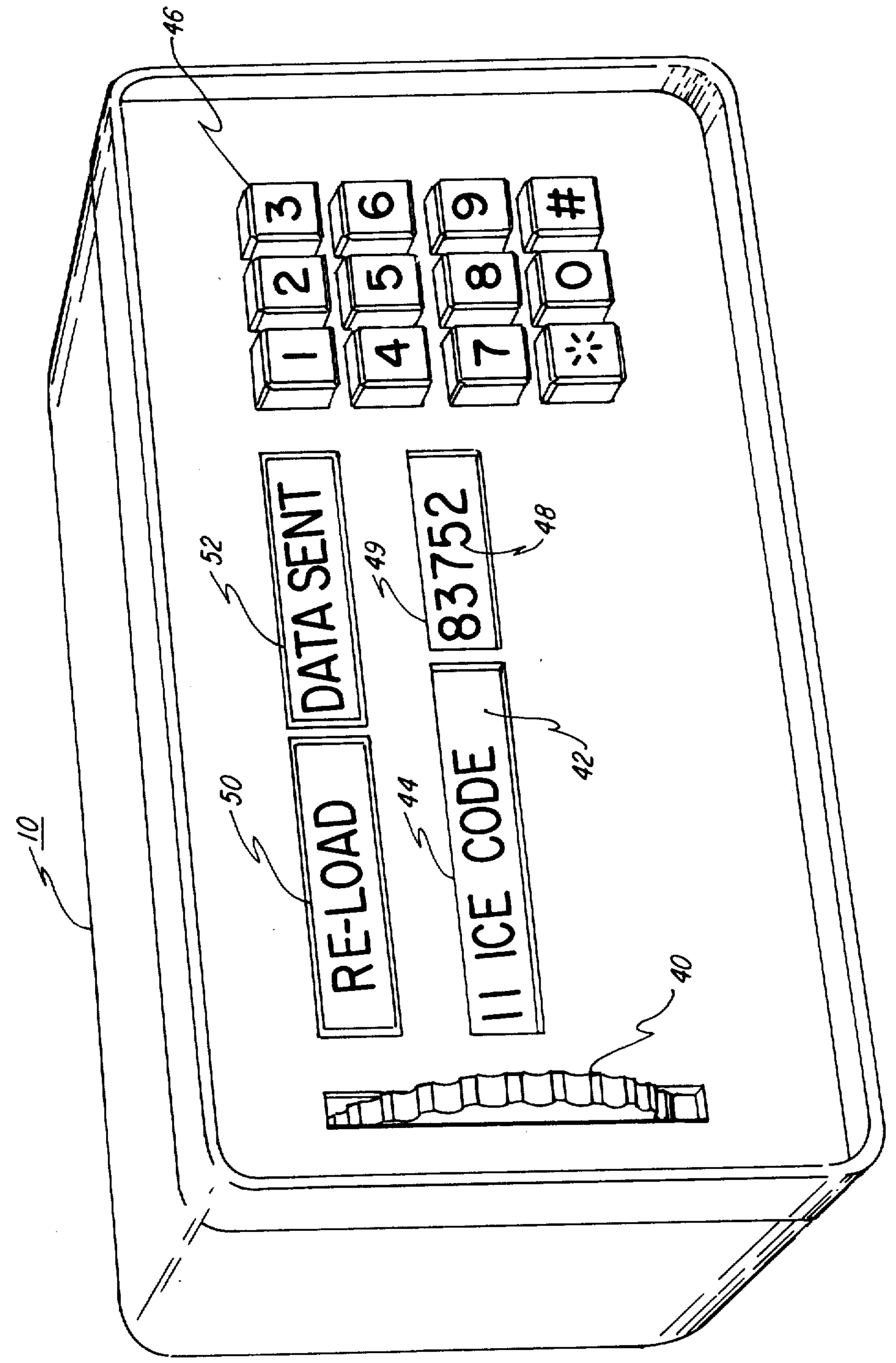
FIG. 2 is a front equipment view of a report register including the invention, illustrating the mode selector thumbwheel switch, the keyboard, the message display window and message group heading window, and the data sent and reload indicators.

FIG. 2 includes a perspective view of the report register 10. The report register 10 can be easily mounted and connected to the existing radio-telephone. The mode selector circuit 20 includes a thumbwheel 40 that is coupled to an indicator 42 that provides an indication of the mode of operation (message group heading) through a window 44. The mode indicator 42 is in the shape of a drum (not shown) and has the message group headings illustrated in FIG. 3 mounted along the circumference of the drum. The data is loaded in the data memory 16 by a keyboard 46 in the form of a touch type dial pad. The data as it is being loaded, or the data stored in memory, is displayed by a series of LED indicators 48 through the message window 49. The message window 49 provides a five digit number representation of the message group selected by the mode selector switch. A reload indicator 50 is provided to indicate a power loss and the need to reload the data. A data sent indicator 52 is provided that indicates that the report register 10 has outpulsed the data in response to its pre-assigned interrogation signal. In operation, the thumbwheel is set to any of the message group headings identified in FIG. 3 and the data inserted into the report register 10 by the keyboard 46. The data is displayed by the LEDs 48 as it is being inserted, and later as stored. Once the data is stored, it can be subsequently retrieved by merely rotating the thumbwheel 40 to the data location of interest. When the data is to be transmitted, the thumbwheel 40 is rotated to the transmit position and the report register 10 is enabled to outpulse the stored data in response to the coded interrogation signal. After the data is outpulsed, the data sent indicator 52 is actuated indicating that comunication between the ship and a shore station is complete.

Figure 3:
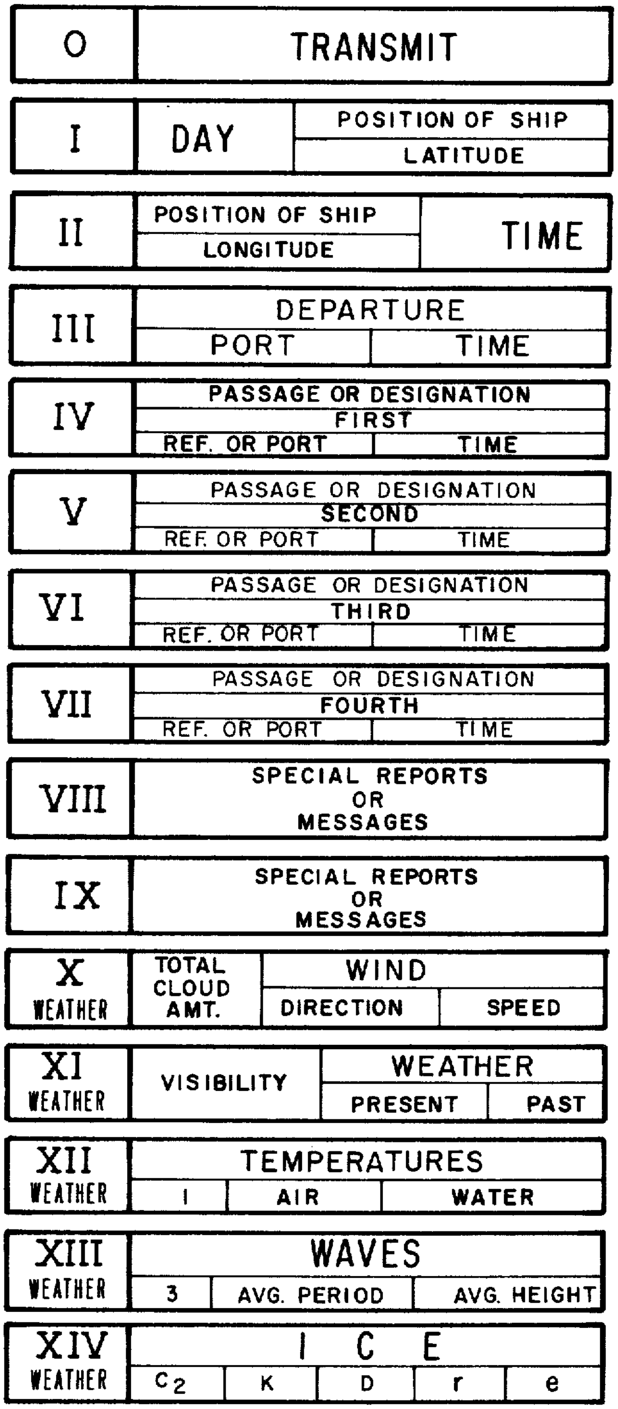
FIG. 3 illustrates the message group headings for use with the mode selector switch.

FIG. 3 illustrates examples of message group headings that can be placed on the thumbwheel 40 drum for identifying shipboard data to be transmitted. There are fourteen message group headings, two for the ship's location, four for the ship's present and future destinations, two for special reports or messages, three for weather, one for ice conditions and one for message transmit. Five digit messages are capable of being entered at each of the message group headings. The thumbwheel 40 is rotated until the selected message group heading appears at the window 44 and the pushbuttons in the keyboard 46 are depressed according to the code assigned to the data to be sent.

Figure 4:
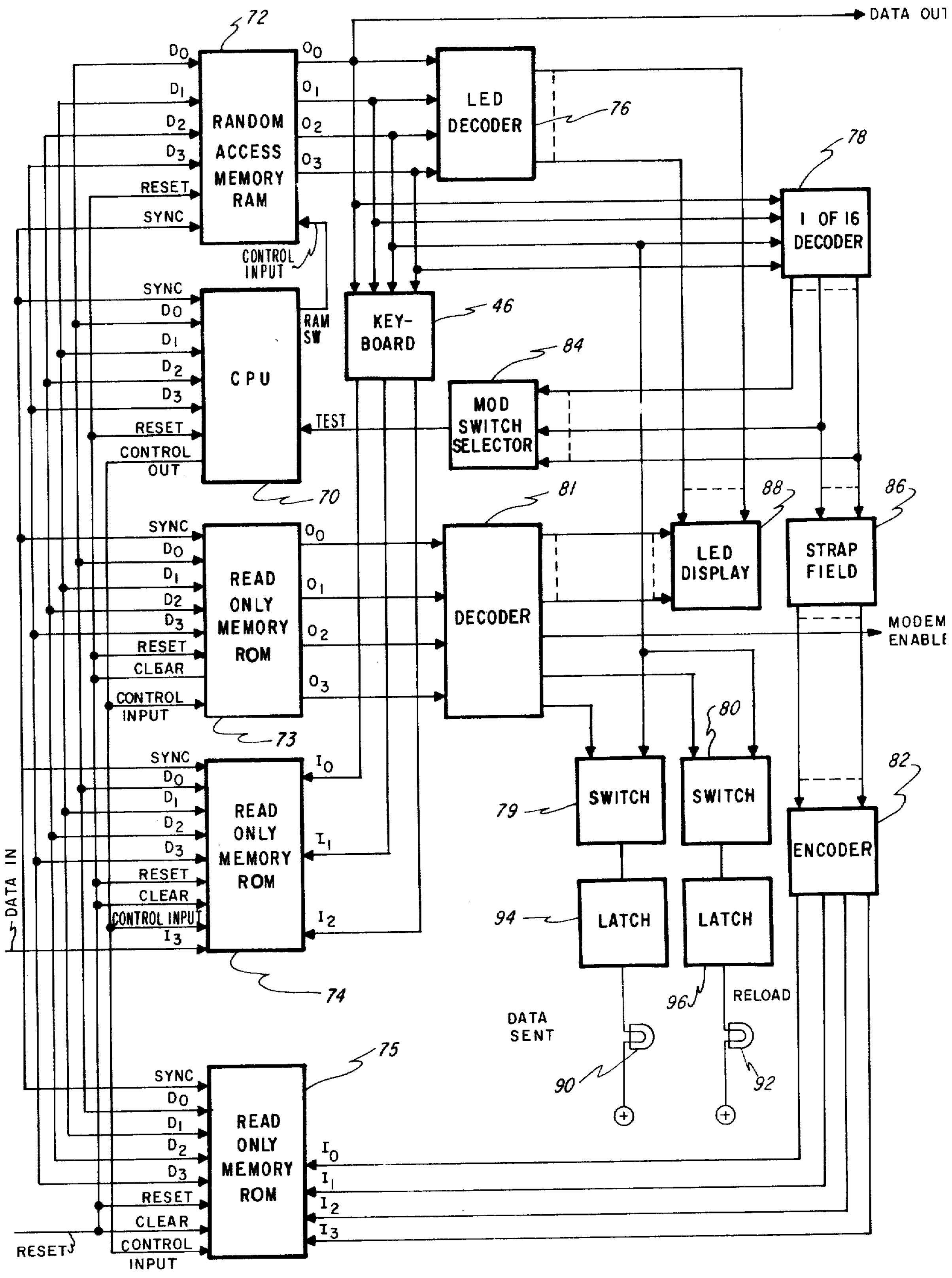
FIG. 4 is an expanded block design of the report register of FIG. 1.

FIG. 4 includes an expanded block diagram of a report register including the invention. A central process unit 70, functions as the control unit and the arithmetic unit, such as an Intel 4004-CPU, and is connected to a Random Access Memory Unit (RAM) 72, such as an Intel 4004-RAM, and three Read Only Memory Units (ROM) 73, 74, and 75, such as an Intel 4001-ROM. The RAM 72 stores data, while the ROMS 73, 74 and 75 store instructions and data tables. The CPU 70 communicates with the RAM 72 and the ROMs 73, 74 and 75 by means of a four-line data bus labeled "D0, D1, D2 and D3". This single data bus is used for all information flow therebetween except for control signals which are sent by the lines labeled "control". Synchronization signals are sent over the line indicated as "sync". Other control lines are designated as "reset" and "clear". The CPU 70 works in conjunction with the RAM 72 and the ROMs 73, 74 and 75 to form a completely self-contained system. The CPU 70 generate a sync signal, indicating the start of an instruction cycle and sends it to the RAM 72 and ROMs 73, 74 and 75. Basic instruction execution requires eight or sixteen cycles. In a typical sequence, the CPU 70 sends twelve bits of address in three-4 bit bytes to ROMs in the first 3 cycles. This address selects a chip in the ROM and an 8 bit word in the chip. The selected ROM chip sends back eight bits of instruction to the CPU 70 in the next 2 cycles. This instruction is sent over the four-line data bus D0, D1, D2 and D3 in two-4 bit bytes. The instructions is then interpreted and executed in 3 cycles. When an input/output instruction is received from a ROM (10, 11, 12 and 13, and 00, 01, 02 and 03) data is transferred to or from the CPU 70 accumulator. The RAM 72 is controlled by a command control line RAM-SW. The address of a RAM chip, register and character is stored in two index registers in the CPU 70 and is transferred to the RAM when a SCR instruction is executed. When the RAM output instruction is received by the CPU 70, the contents of the CPU accumulator is transferred to the RAM output-lines 00, 01, 02 and 03. The CPU 70, the RAM 72, and the ROMs 73, 74 and 75 are controlled by the external reset line. While reset is activated, the contents of the registers and flip-flops are cleared. After reset the CPU 70 will start from address zero. Further detailed information on the CPU 70, the RAM 72, and the ROMs 73, 74 and 75, including timing, programming, etc., can be found in an Intel Corporation users manual entitled "MCS-4 Microcomputer Set" dated Feb., 1973 and U.S. Pat. No. 3,821,715, entitled "Memory System for Multi-Chip Digital Computer" issued on June 28, 1974 to M. E. Hoff, Jr., et al.

The output lines 00, 01, 02 and 03 of the RAM 72 are connected to a LED decoder 76, the vertical lines of the keyboard 46, a decoder 78, and two switch circuits 79 and 80. The output lines 00, 01, 02 and 03 from the ROM 73 are connected to a decoder 81. The input lines 10, 11 and 12 of the ROM 74 are connected to the horizontal lines of the keyboard 46. The input lines 10, 11, 12 and 13 of the ROM 75 are connected to the output lines of an encoder circuit 82. The output lines of the decoder 78 are connected to a fifteen position rotary mode selector switch 84 and to a strap field 86. The output lines of the strap field 86 are connected to the inputs of the encoder 82. The output lines of the LED decoder 76 are connected to five, seven segment LED display 88, to select the number to be displayed. The output lines of the decoder 81 are connected to the LED display 88 to select a single LED element to respond to the decoder 81 signal, and are connected to switch circuits 79 and 80 and also applies an enable signal to the modem 13. The outputs of the switch circuits 79 and 80 are connected to enable the data sent light 90 and the reload light 92 respectively, via separate latch circuits 94 and 96. The output of the report register is applied to the modulator 28 via the output line 00 of the RAM 72. The interrogation signal is received by the rom 72 from the demodulator 26 on the line labeled "data in".

As previously mentioned, there are fourteen data positions and a transmit position in the rotary mode selector switch 84. The moving contact of the switch 84 is connected to the test line of the CPU 70, while the stationary contacts are connected to the decoder 78.

In order to identify the position of the mode selector switch 84, the CPU 70 sends sequential messages via RAM 72 and the decoder 78 to scan the stationary contacts of the mode selector switch 84. When the position of the switch is located, the test line is raised high and switch position is recorded in the CPU 70. If the mode switch 84 is in one of the fourteen message group positions, the CPU 70 accesses the memory in the RAM 72 to extract the data from the location corresponding to the mode switch location and applies the same to the LED display 88 via LED decoders 76 and 81. The data is outputed by the RAM in a digit sequence from left to right (as viewed in the message window 49 of FIG. 2) a separate message for each LED unit.

The CPU 70 sequentially applies messages to the decoder 81 via ROM 73, to enable the LED units in sequence. The arrangement is such, that although all LED units receive the data message from the decoder 76, only one LED is enabled by the decoder 81 to respond to the data message, thereby providing synchronization between the decoder 76 output and the LED unit to display the same. The speed used in switching between LEDs causes the display to appear continuous.

Each time the CPU 70 steps from one LED unit to the next, a check is made to see if a pushbutton in the keyboard 46 is depressed. This is accomplished by the CPU 70 sending a message to the RAM 72 to enable all output lines 00, 01, 02 and 03. The LED unit will not respond since the ROM 73 output lines 00, 01, 02 and 03 are not enabled at this time. If a pushbutton on the keyboard 46 is depressed, a signal will appear on one of the input lines I0, I1 and I2 of the ROM 74, which in turn indicates to the CPU 70 that a pushbutton has been depressed. The CPU 70 now sends sequential messages to the RAM 72 to sequentially enable the RAM output lines 00, 01, 02 and 03 until a signal is received on one of the ROM 74 input lines I0, I1, and I2, at which time the depressed pushbutton is identified. The CPU 70 now computes and stores a digital signal, equivalent to the depressed pushbutton in the memory location corresponding to the position of the mode selector switch 84 and in the next digit storage position. As soon as the pushbutton is released, the keyboard scan routine stops and readout display routine restarts. The data is stored in memory and displayed in a wrap-around fashion, from first the digit to the fifth digit, and then back to the first digit. In between each digit displayed, a check is made to see if the mode selector switch 84 is still in the same position. If not, the new position is recorded and the display routine and keyboard scan routine continue for the new switch location. In effect three operations continuously take place in getting from one sequence to the next, i.e., multiplex display, rescan keyboard, rescan mode selector switch 84 and then back to multiplex display. Hence, as can be seen the input data can be inserted into the report register in any sequence and the display, keyboard and mode selector scan routine will assure that the data is stored in the correct location and sequence.

Once all the data to be transmitted is inserted into the report register 10 and the mode selector switch 84 is set for transmit, the CPU 70 receives a test signal indicating the transmit position and is conditioned for a data output routine. The CPU 70 now performs the polling recognition and mode switch scan routines, and ignores the keyboard. An interrogation from a shore station will take the form of two start digits followed by five digits of coded signal identifying the report register being poled followed by a terminating digit. The message is in serial form and in a VARIAN ASKII code. The input message is received by the CPU 70 via terminal I3 of ROM 74 and is triggered on the leading edge of the first signal and then samples the following bits. The CPU 70 will reject all but the code assigned to the report register. This is accomplished by causing the strap field 86 and encoder 82 to be set to a programmed code and comparing the code with the received polling signal on a digit by digit basis to the strap field 86 via RAM 72 and the decoder 78. The strap field is wired in accordance with the code assigned to the particular report register. If the message has the proper code, the CPU 70 jumps to a series of instructions for outpulsing the data by reading the binary data from the RAM 72 into the CPU, reforming the data in the VARIAN ASK II, including a parallel to serial conversion, inserting the report register identity in memory, and outpulsing the data to the modem 13 via output port 00 of the RAM 72. The identity code of the register is retrieved from the strap field 86 and encoder 82.

The CPU 70 applies a binary signal to the decoder 81 via ROM 73 so that an enable signal is generated for enabling the modem 13 and radio transmitter 34 to transmit the data to the shore station. When the message is outpulsed, the CPU 70 addresses the RAM 72 to apply an enable signal to the switch circuit 79 and 80 via output port 02, and addresses the ROM 73 to apply a binary signal to the decoder 81 to apply a second signal to the switch 79. The simultaneous presence of signals on both the inputs of the switch 79 operates latch circuit 94 and energizes the data sent lamp 90 indicating that the communication is complete. As previously mentioned, when power is removed from the report register and subsequently turned on, the reload lamp 92 is energized. In such case, the CPU 70 addresses the RAM 72 to apply an enable signal on the output port 02 and addresses the ROM 73 to apply a binary signal to the decoder 81 to enable the switch 80 to actuate the latch circuit 96 and energize the reload lamp 92.

Figure 5:
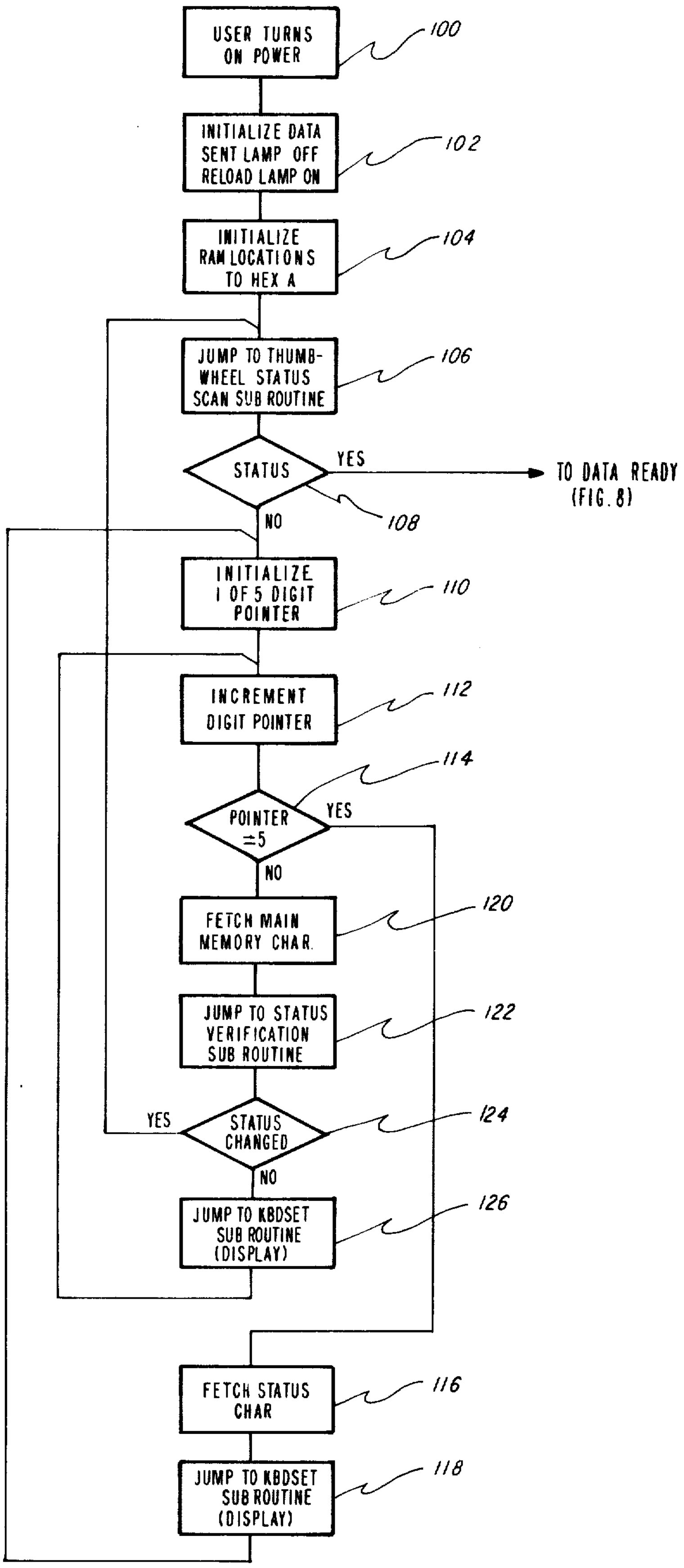
FIGS. 5–16 are flow diagrams for the software programs involved in the operation of the report register of FIGS. 1–4.
Figure 6:
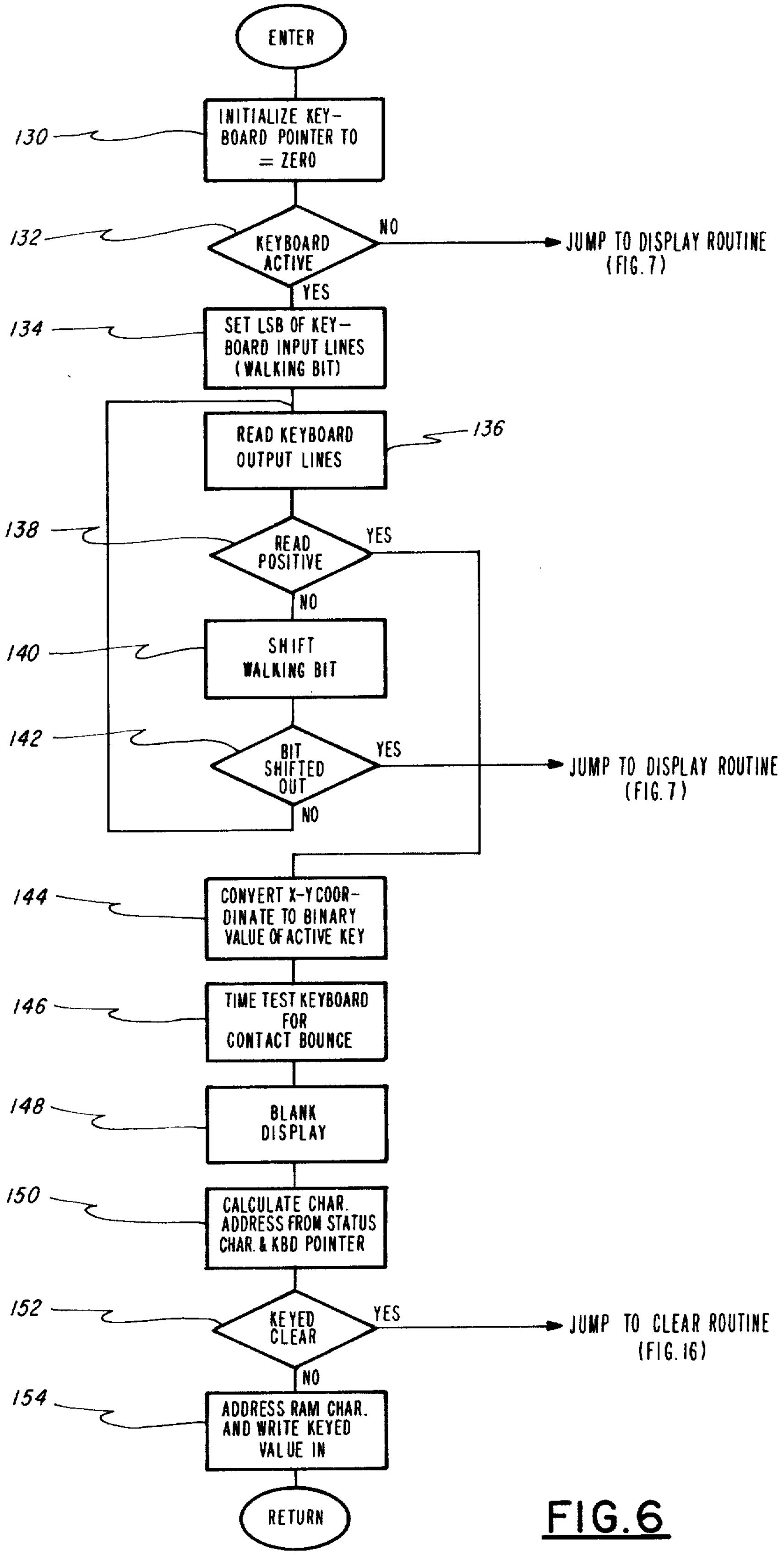

FIG. 5 is a flow diagram for the program to start the processor upon the application of power. When power is applied 100, the reload lamp is energized 102, and the RAM 72 data storage locations are initialized to a hex symbol A 104. The CPU 70 is jumped to a mode selector switch subroutine 106. If the mode selector switch 84 is in the transmit position, step 108 shifts the program to the data ready program (FIG. 8), if in a message mode position, the decoder 78 scans the positions of the mode selector switch 84 through steps 110 and 112. When the switch position is located, its position is stored (steps 114 and 116) and a jump is made to the keyboard subroutine 118. If a system pointer is not equal to five 114, then the prior position of the switch is taken from memory 120 and a jump is made to the verification routine 122. If the status of the switch has not changed 124, a jump is made to the keyboard subroutine 126 (FIG. 6). On the other hand, if the status is changed, the program is returned to step 106.

The flow chart of the keyboard routine is illustrated in FIG. 6. All the output lines of the RAM 72 are raised high and the keyboard 46 tested to see if a pushbutton is depressed, steps 130 and 132. If a pushbutton is not depressed, the program jumps to the display routine. If a pushbutton is depressed, the output of the RAM 72 is scanned and the input of the RAM 74 monitored, steps 134, 136 and 138. If no signal is received, the output is steped to the next position and if the scan is completed the program is jumped to the display routine, steps 140 and 142. If the scan is not complete, the program is returned to step 136. If in step 138, a depressed pushbutton is scanned, the identity of the pushbutton is converted to a binary value and stored 144, a test is made for contact bounce 146, and the display is blanked 148. The character address is calculated 150. If a clear key is depressed, the program jumps to the clear routine (FIG. 16), otherwise the RAM 72 is addressed and the keyed value is written into memory, step 150, 152 and 154, and the program is returned to the program of FIG. 5.

Figure 7:
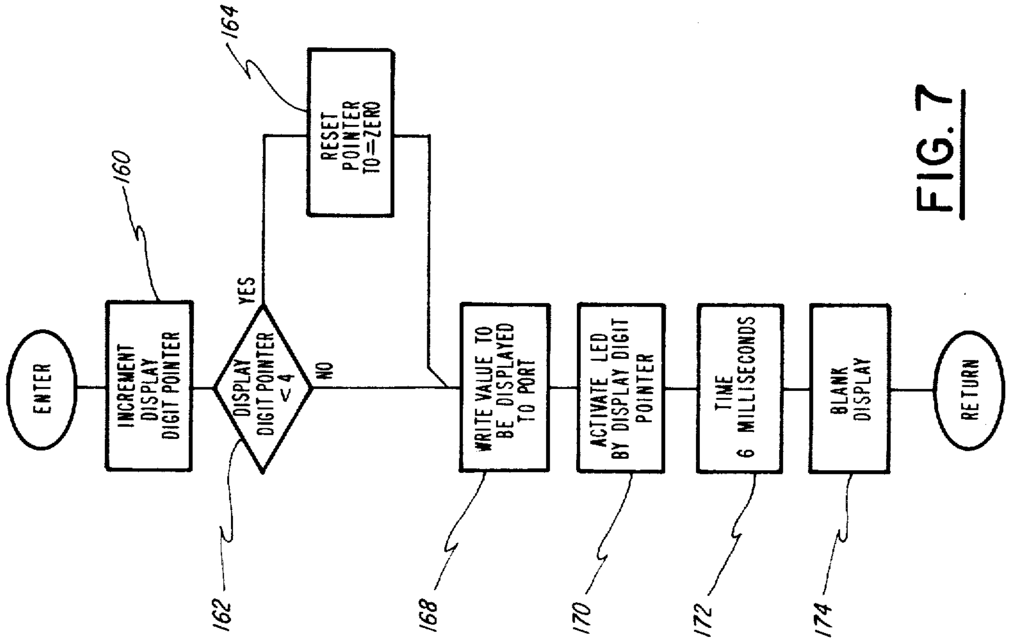

The flow chart of the display routine is illustrated in FIG. 7. The output of the decoder 76 is incremented and a test is made if the output is greater than four, steps 160 and 162. If the output is greater than four, it is reset to zero 164. The value to be displayed is applied to the LED units 88 and the selected LED digit is activated, steps 164 and 168. After six milliseconds the display is blanked, steps 172 and 174 and the program is returned to FIG. 5.

Figure 8:
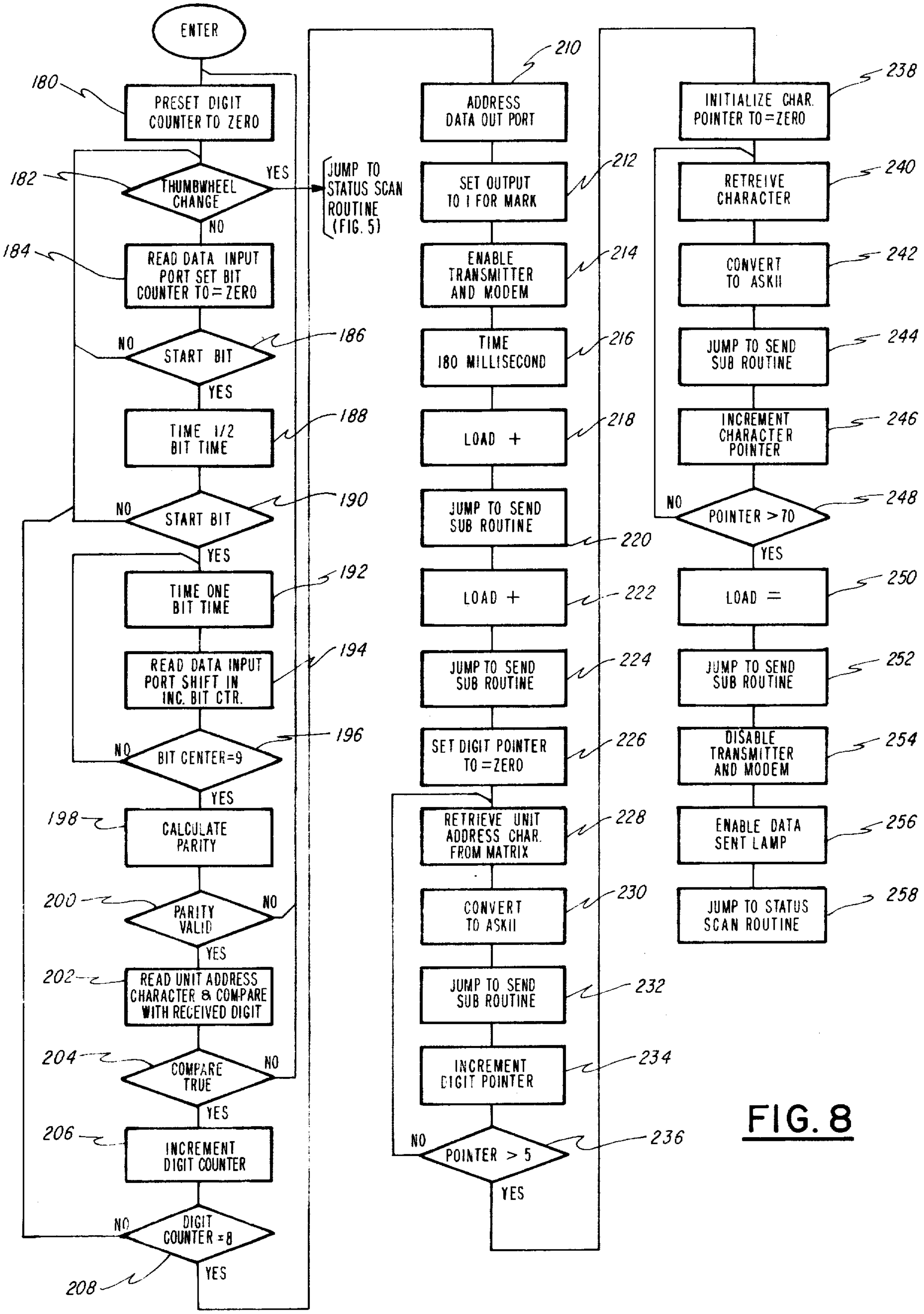

FIG. 8 is a flow diagram of the data ready program. A digit counter bit is preset to zero for the receipt of the input interrogation signal and a check is made to see if the mode selector switch 84 is still in the transmit position, steps 180 and 182. If the position is changed, the program jumps to the status scan routine. If the switch position is not changed, the data at the input port of ROM 74 is read, a bit counter is set zero 184, and a test is made for a start bit 186. If no start bit is present, the program is returned to the step 182 and thereafter continuing circulating in a "no data loop" until a start bit is received, or the mode selector switch is removed from the transmit position. If a start bit was present, a delay of one-half bit time is introduced, and a second test for a start bit is made 190. If a valid start bit is present, a one bit delay 192 is introduced, the input data is read, and the bit counter is incremented 194. A test is made for 9 bits 196. If nine bits are not stored, the program is returned to step 192, and the loop is circulated until all 9 bits are stored. Thereafter, the parity is calculated 198, and a test is made to determine if the parity is correct 200. If the parity is invalid, program is returned to step 180. If the parity is valid, a test is made by the field strap 86 and the encoder 82 to compare 204 the interrogation code bit with that assigned. If the comparison is not true, the program is returned to step 180. If the comparison is true, the digit counter is incremented 206, and a check 208 is made to determine if eight digits have been processed. If eight digits have not been processed, the program is returned to step 182 and the steps 182 – 208 repeated until the digit counter is incremented for eight digits. When eight valid digits have been received, the output port of the RAM 72 is addressed and the output port is set to a mark condition 212. The transmitter and modem is enabled 214, and after a 180 millisecond delay to stabilize the transmitter 216, eight bits are read from a ROM corresponding to a plus sign in VARIAN ASKII form 218, a jump is made to the send subroutine 220 (FIG. 9), another plus sign is read from a ROM 222, and another jump 224 is made to the send subroutine. A digit pointer is set for zero 226 to count five digits corresponding to the ship's identification code. The first digit (4 bits) is retrieved 228 from the combination of the strap field 86 and encoder 82 and converted to VARIAN ASKII form 230. A jump 232 is made to the send subroutine and the digit counter is incremented 234. A test 236 is made to see if all five identifying digits have been sent. If not, the program is returned to step 228. If all five identifying digits have been sent, a counter is initialed to zero 238. A data digit is now retrieved 240 from the ROM 72, converted to VARIAN ASKII form 242, and a jump is made to the send subroutine 244. The pointer is incremented 246, and a test is made if all seventy data digits have been sent. If not, the program is returned to step 240 and circulated in this loop until all 70 digits have been sent. At this time, a VARIAN ASKII equal sign is loaded 250, and a jump is made to the send subroutine 252. When all the information has been sent and the transmitter is disabled 254. The data sent lamp 90 is enabled 256, and a jump is made to the status scan routine 258 (FIG. 5).

Figure 10:
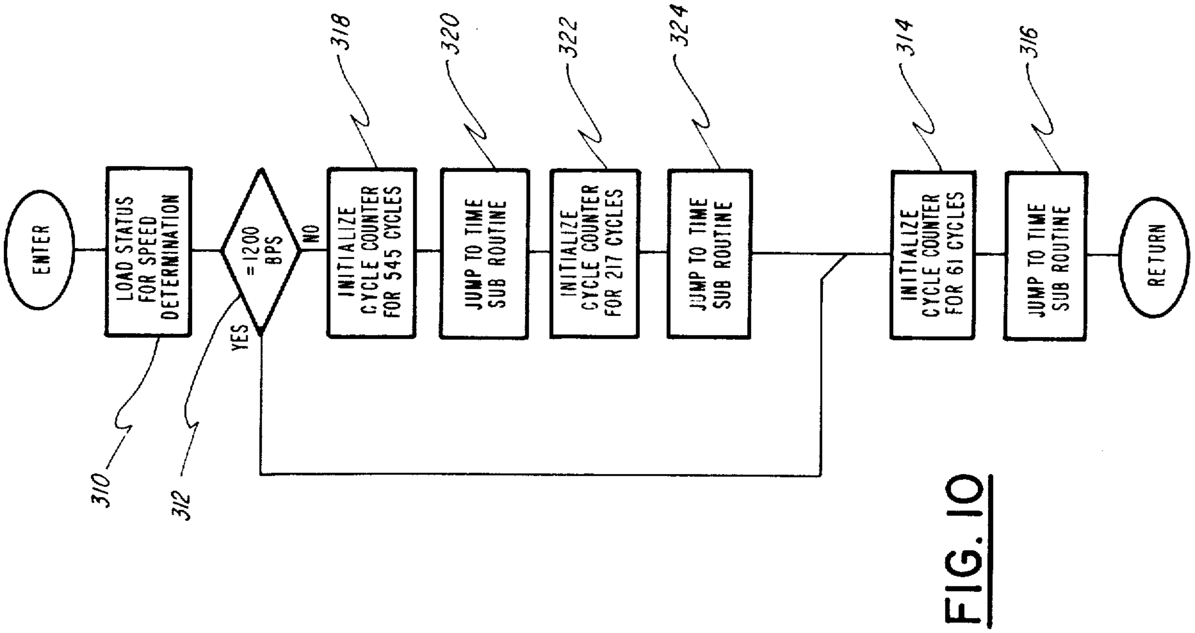
Figure 9:
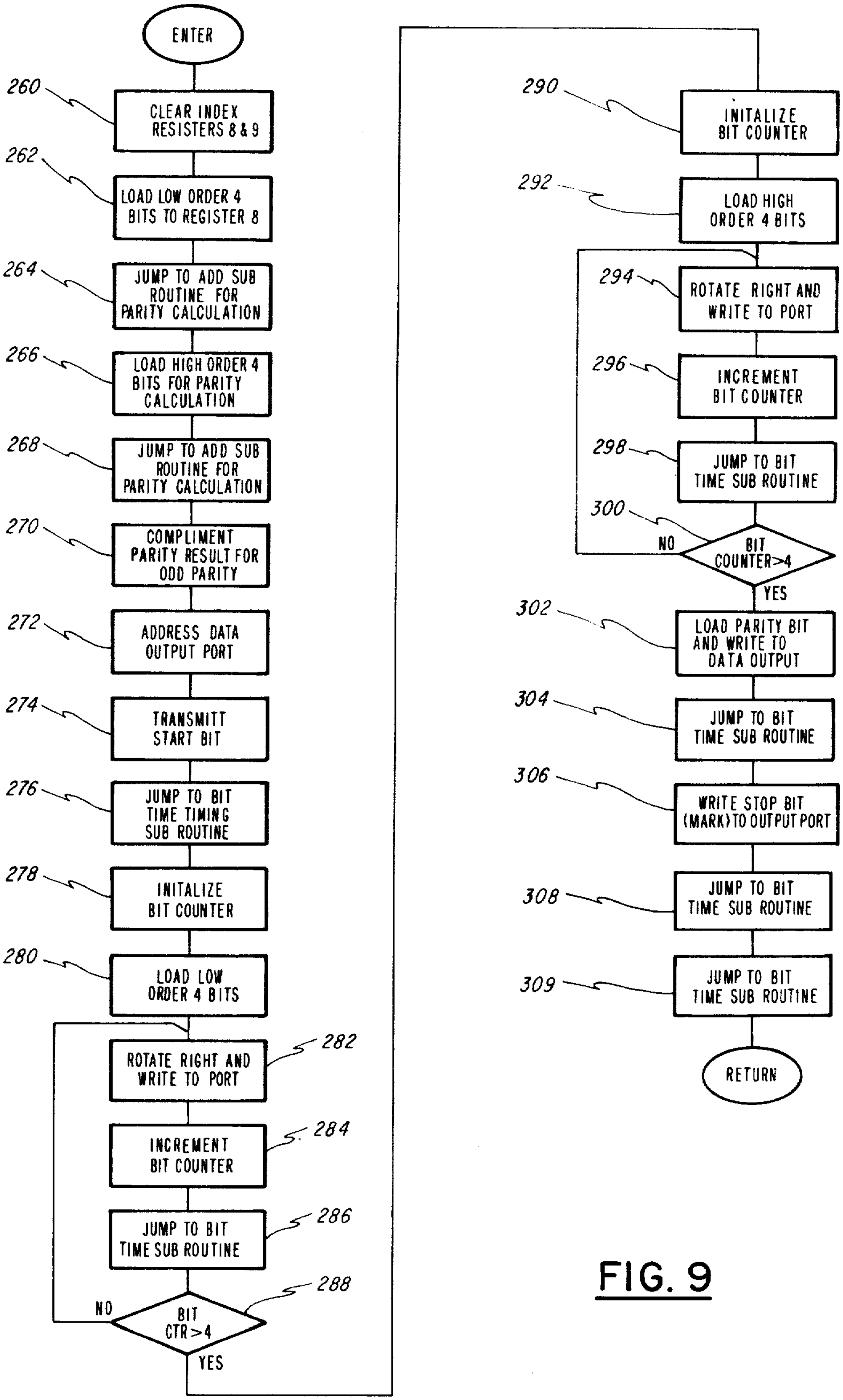

The flow diagram of the send subroutine is illustrated in FIG. 9. For each digit transmitted the send subroutine includes a start digit, eight bits of information, a parity bit, and two stop bits. A pair of registers are cleared 260, one of the registers are loaded 262 and a jump is made to an add subroutine 264 (FIG. 13) for a parity calculation. The high order four bits are loaded 266 and a jump is made to the add subroutine 268 for even parity calculations. A complement is made for odd parity 270 and the RAM 72 output line 00 is addressed 272, the start bit is transmitted 274 and a jump is made to a bit timing subroutine 276 (FIG. 10). The bit counter is initialized 278 and the low order four bits are loaded 280. The data is rotated and written to the output line 00 282, the bit counter incremented 284 and a jump is made to the bit time routine 286. A test is made for four bits 288, if not, the program is returned to step 282. When four bits are counted 288, the bit counter is initialized 290 and four high order bits are loaded 292, rotated and written to the output line 294, the bit counter incremented 296, and a jump is made to the bit time routine 298. Steps 282 – 288 and 294 – 300 provide for a parallel to serial conversion. When four bits are counted 300, a parity bit is loaded and written to the output line 302 and a jump is made to the bit time routine 304. A stop bit is written to the output line 306 and two jumps are made to the bit time routine 308 and 310 to provide 2 stop bits.

Figure 11:
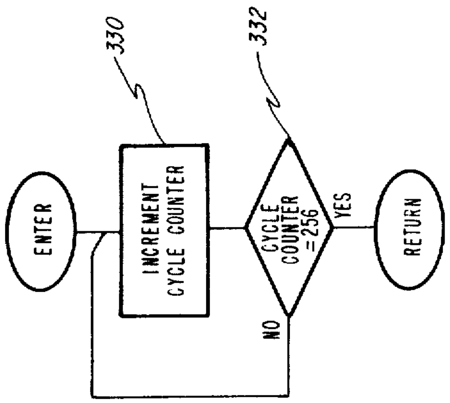

The bit time subroutine is illustrated in FIG. 10. The speed determination status is loaded 310 to determine whether this system is in transmit or test. If in test, the system is slowed to teletype input operation. A timing check is made 312. If the speed is proper for transmit, the cycle counter is initialized 314 and a jump is made to the time subroutine 316 (FIG. 11). If in test, the cycle counter is initialized 318, a jump is made to the time subroutine 320, after which the cycle counter is again initialized 322 and a jump is again made to the time subroutine 324. The steps 318 – 324 slow down the system operation to that of a teletype input.

The time subroutine is illustrated in FIG. 11. The cycle counter is incremented 330 and a check is made for terminal count 332. If the count completes, the program is returned, if not, the cycle counter is incremented again 330 and the process repeated.

Figure 12:
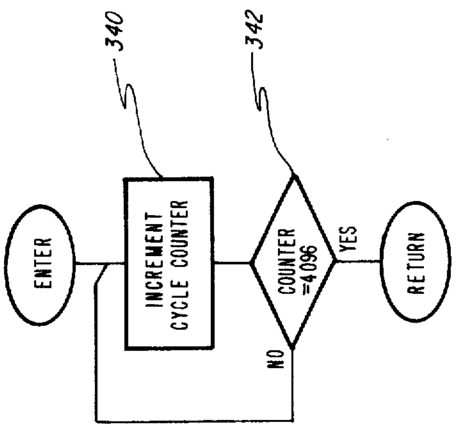

The extended time subroutine is illustrated in FIG. 12. The cycle counter is incremented 340 and the counter is tested for terminal count 342. If not, the cycle counter is incremented again and the program repeated. The extended time subroutine provides for long timing cycles, such as for the 180 millisecond delay for transmitter warm up.

Figure 13:
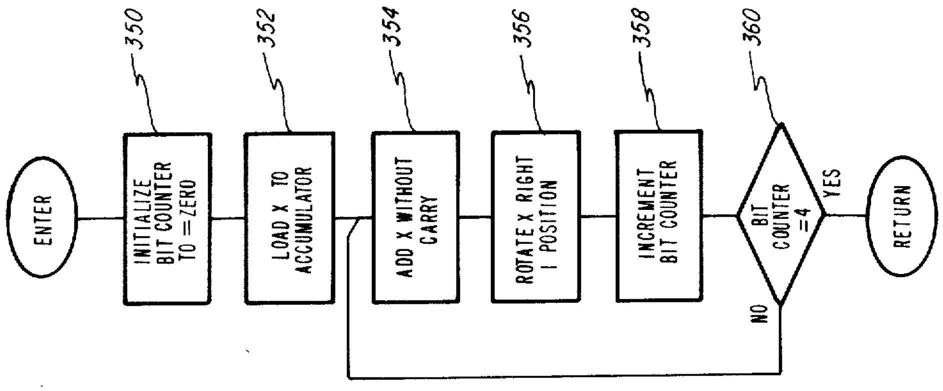

The add subroutine for calculating parity is illustrated in FIG. 13. The bit counter is initialized to zero 350 and a number is loaded into the accumulator 352. The number is added to itself without a carry 354 and rotated right one position 356. The bit counter is incremented 358 and a check 360 is made for 4 bits. If not, the program is returned to the add step 354 and repeated. The result is that the least significant bit is set if the number of bits is odd and reset if even.

Figure 14:
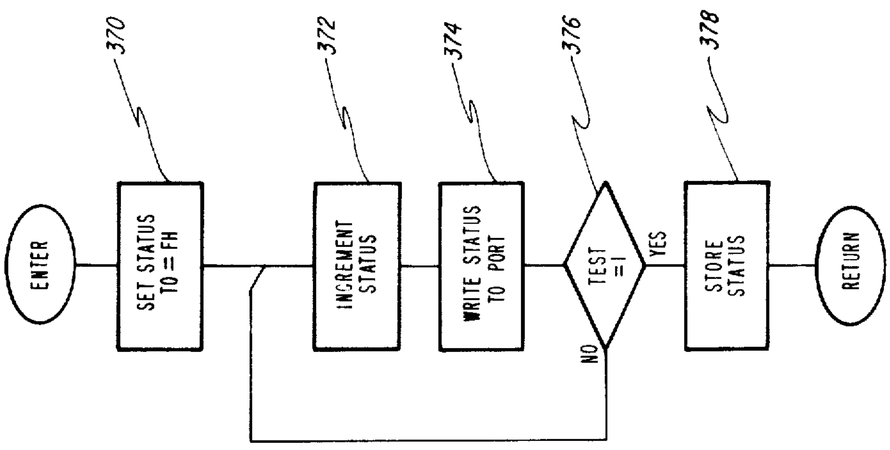

The status scan routine is illustrated in FIG. 14. The status is set to a preset value 370 and incremented 372 to a start location. The status is written to the output line 374 and a test is made for a one 376. If a one is present, the status is stored 378, if not, the program is returned to the increment step 372 and repeated.

Figure 15:
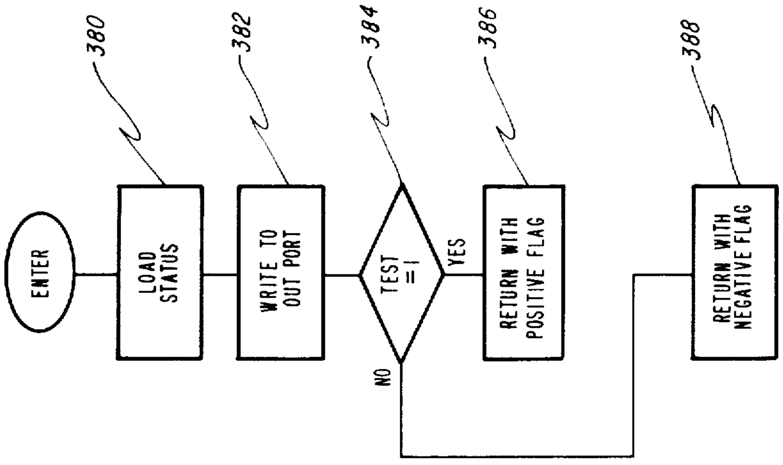

The status verification subroutine is illustrated in FIG. 15. The status of the mode selector switch is loaded 380, written to the output line 382, and tested for a one 384. If the one is present, a positive flag is returned 386 indicating a true comparison, if not, a negative flag is returned 388 indicating an invalid test.

Figure 16:
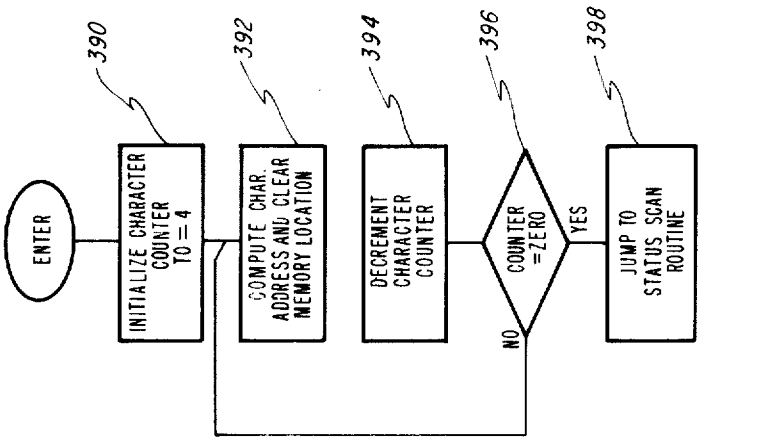

The clear currently selected five locations in memory routine is illustrated in FIG. 16. The character counter is initialized to four 390, the character address of the mode selector switch is computed and the corresponding memory location cleared 392, and the character counter is decremented 394. A check is made for zero 396. If a zero is present, a jump is made to the status scan subroutine (FIG. 14) 398, if not, the program is returned to step 392 and repeated.

I claim:

1. A report register for use with a mobile unit for automatically transmitting data to a distant station via a radio in response to an interrogation signal from the distant station, comprising:

input switch means for accepting input data to be stored;

means for storing data;

means for displaying data;

switch means having a plurality of record data positions and at least one transmit data position;

means responsive to said switch means in said record data positions for applying input signals received from said input switch means to said storage means;

means responsive to said switch means in said record positions for applying data stored in said storage means to said displaying means, and means responsive to an interrogation signal and said switch means in said transmit position for outpulsing the data stored in said storage means to the radio for transmission.

2. A report register for use with a mobile unit for automatically transmitting data to a distant station via radio transmitter-receiver in response to an interrogation signal from the distant station, comprising:

keyboard means for inserting data into the register;

means for storing data;

means for displaying data;

switch means having a plurality of data record positions and at least one transmit position;

means responsive to said switch means for selecting a separate storage location in said storage means for each of said data record positions;

means responsive to the actuation of said keyboard means when said switch means is in the record positions for storing data in said storage means in the storage locations corresponding to the switch means record positions;

means responsive to said switch means in said record positions for applying data from said storage means to said displaying means from the storage locations corresponding to said switch means record positions;

indicia means coupled to said switch means for identifying the mode of operations corresponding to the record and transmit positions, and means responsive to the receipt of a preset interrogation signal from the transmitter-receiver when said switch means is in the transmit position for outpulsing the data stored in said storage means and for enabling the transmitter-receiver to transmit said outpulsed data.

3. A report register for use with a mobile vehicle for automatically transmitting data to a distant station via a radio transmitter-receiver in response to an interrogation signal from the distant station, comprising:

input switch means for receiving input data to be stored;
digital processor means, including memory means for storing data;
means for displaying data;
switch means having a plurality of record data positions and at least one transmit data position;
means responsive to said switch means in said record data positions for enabling said processor means to apply input signals received from said input switch means to said memory means;
means responsive to said switch means in said record positions for enabling said processor means to apply data stored in said memory means to said displaying means, and
means responsive to said switch means in said transmit position for enabling said processor means to respond to a precoded interrogation signal from the transmitter-receiver for outpulsing the data stored in said memory means to the transmitter-receiver.

4. A report register for mobile vehicles for automatically transmitting data to a distant station via radio transmitter-receiver in response to an interrogation signal from the distant station comprising;
keyboard means for inserting data into the register;
digital processor means, including memory means for storing data;
means for displaying data;
switch means having a plurality of data record positions and at least one data send position;
indicia means coupled to said switch means for identifying the mode of operations corresponding to the data record and send positions;
circuit means responsive to said switch means for selecting a separate storage location in said memory means for each of said record positions and enabling said processor means to: (a) respond to the actuation of said keyboard means when said switch means is in the data record positions for storing data in said memory means in the storage locations corresponding to the switch means record positions, and (b) to apply data from said memory means to said displaying means from the storage locations corresponding to said switch means data record positions, and
circuit means responsive to said switch means in the send data position for enabling said processor to respond to a precoded interrogation signal to outpulse the data stored in said memory means and for enabling the transmitter-receiver to transmit said outpulsed data.

5. A report register for mobile vehicles for automatically transmitting data to a distant station via a transmitter-receiver in response to an interrogation signal from the distant station, comprising:
a digital computer, including memory units, coupled to the transmitter-receiver;
keyboards means;
switch means, having a plurality of data entry positions and at least one data send position, for identifying the data to be entered and selecting the entry and send modes of operation;
circuit means connecting said switch means to said digital computer so that when said switch means is in said data entry position the data storage locations in the memory units are preselected in accordance with the switch positions, and when said switch means is in said data send position said digital computer is conditioned to outpulse the data stored in the memory units;
circuit means connecting said keyboard means to said digital computer so that, in response to actuation of a switch in said keyboard means, a digital value of the actuated switch is stored in the memory units at a location determined by the position of said switch means in one of said data entry positions;
circuit means for connecting said display means to said digital computer so that the data stored in storage locations corresponding to the data entry positions of said switch means is displayed;
circuit means for applying coded interrogation signals from the transmitter-receiver to said digital computer, and
precoded circuit means coupled to said digital computer providing an indication of the precoded interrogation signal assigned to the report register so that said digital computer responds to a preset interrogation signal and rejects others to outpulse the data in said memory units along with a precoded interrogation signal.

6. A report register as defined in claim 5 wherein:
said keyboard means includes a plurality of input lines, a plurality of output lines, and a plurality of switches interconnecting the input lines to said output lines in the form of a matrix, and
said keyboard means connecting circuit means connects said keyboard to said digital computer so said digital computer detects an actuated switch by applying signals to all input lines for detecting a signal on any of the output lines, and subsequently identifies the actuated switch by sequentially scanning the input lines for a signal on an output line, wherein a comparison of the input line scanned and the output line with a detected signal provides the identity of the actuated switch.

7. A report register as defined in claim 5 wherein:
said switch means connecting circuit means includes a decoder circuit responsive to sequential binary signals from said digital computer for applying sequential scanning signals to said switch means so that in response to a binary signal corresponding to the position of the switch means said digital computer detects a signal from the switch means thereby identifying the position of said switch means.

8. A report register as defined in claim 5 wherein:
said display means include a plurality of series oriented display elements; and
said display means connecting circuit means includes a first decoder responsive to binary signals from said digital computer for controlling the value to be displayed, and a second decoder responsive to binary signals from said digital computer for controlling the element to respond to the first decoder output signals.

9. A report register as defined in claim 5 wherein:
said precoded circuit means includes a strap field coupled to an encoder which in turn is connected to said digital computer, and a decoder coupled between said digital computer and strap field so that said encoder applies signals to said digital computer in response to preselected binary signals applied to said decoder.

10. A report register as defined in claim 5 wherein:

said digital computer includes a central processor, at least one read only memory, at least one random access memory, and a plurality of data lines interconnecting said central processor for communicating with said read only and random access memories for transmitting stored signals to and from said read only and random access memories.

11. A report register as defined in claim 5 wherein: said digital computer sequentially applies data to said display means and detects the position of said switch means and the actuation of a switch in said keyboard means between sequential application of data to said display means.

12. A report register is defined in claim 11 wherein: said digital computer detects the position of said switch means prior to storing the digital value of an actuated switch in said keyboard means.

13. A report register as defined in claim 12 wherein: indicia means are coupled to said switch means for identifying the mode of operations corresponding to the data record and send positions.

14. A report register for mobile vehicles for automatically transmitting data to a distant station via a transmitter-receiver in response to an interrogation signal from the distant station, comprising:

a digital computer, coupled to the transmitter-receiver, including a central processor, at least one read only memory at least one random access memory, and a plurality of data lines interconnecting said central processor for communicating with said read only and random access memories for transmitting stored signals to and from said read only and random access memories;

switch means, having a plurality of data entry positions and at least one data send position, for identifying the data to be entered, and selecting the entry and send modes of operation;

circuit means connecting said switch means to said digital computer so that when said switch means is in said data entry position the data storage locations in random access memory are preselected in accordance with the switch position, and when said switch means in in said data send position said digital computer is conditioned to outpulse the data stored in the random access memory, including a decoder circuit responsive to sequential binary signals from said digital computer for applying sequential scanning signals to said switch means so that in response to binary signals corresponding to the position of the switch means said digital computer detects signals from the switch means thereby identifying the position of said switch means;

keyboard means including a plurality of input lines, a plurality of output lines and a plurality of switches interconnecting the input lines to said output lines in the form of a matrix;

circuit means connecting said keyboard means to said digital computer so that, in response to actuation of a switch in said keyboard, a digital value of the actuated switch is stored in the random access memory at a location determined by the position of switch means in one of said data entry positions, said digital computer detects an actuated switch by applying signals to all input lines and detects a signal on any of the output lines, and subsequently identifies the actuated switch by sequentially scanning the input lines for a signal on an output line wherein a comparison of the input lines scanned and the output line with a detected signal provides the identity of the actuated switch;

display means including a plurality of series oriented display elements;

circuit means for connecting said display means to said digital computer so that the data stored in storage locations corresponding to the data entry positions of said switch means is displayed, including a first decoder responsive to binary signals from said digital computer controlling the value to be displayed and a second decoder responsive to binary signals from said digital computer for controlling the element to respond to the first decoder output signals;

circuit means for applying coded interrogation signals from the transmitter-receiver to said digital computer, and circuit means coupled to said digital computer providing an indication of the precoded interrogation signal assigned to the report register so that said digital computer responds to said precoded interrogation from said transmitter-receiver and rejects others to outpulse the data in said random access memory along with an identification code to said transmitter-receiver, including a strap field coupled to an encoder which in turn is connected to said digital computer, and a decoder coupled between said digital computer and said strap field so that said encoder applies signals to said digital computer in response to preselected binary signals applied to said decoder.

15. A report register as defined in claim 14 wherein: said digital computer sequentially applies the data to said display elements and detects the position of said switch means, and the actuation of a switch in said keyboard means, between the sequential application of the data to said display elements.

16. A report register as defined in claim 15 wherein: said digital computer detects the position of said switch means prior to storing the digital value of an actuated switch in said keyboard means.

17. A report register as defined in claim 16 wherein: indicia means are coupled to said switch means for identifying the mode of operations corresponding to the data record and send positions.

18. A report register as defined in claim 17 wherein: said digital computer, in response to the precoded interrogation signal, interrogates said circuit means including said strap field, said encoder and said decoder, to receive said identification code.

19. A report register as defined in claim 18 wherein: said digital computer, in response to the precoded interrogation signal, enables the transmitter-receiver to transmit outpulse data.

* * * * *